(12) United States Patent
Funabashi (10) Patent No.: US 9,649,945 B2
(45) Date of Patent: May 16, 2017

(54) VEHICLE AND METHOD OF CONTROLLING THE VEHICLE

(71) Applicant: Yasutaka Funabashi, Nagoya (JP)

(72) Inventor: Yasutaka Funabashi, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 309 days.

(21) Appl. No.: 14/413,016

(22) PCT Filed: Oct. 11, 2013

(86) PCT No.: PCT/IB2013/002342
§ 371 (c)(1),
(2) Date: Jan. 6, 2015

(87) PCT Pub. No.: WO2014/060835
PCT Pub. Date: Apr. 24, 2014

(65) Prior Publication Data
US 2015/0210173 A1    Jul. 30, 2015

(30) Foreign Application Priority Data

Oct. 15, 2012  (JP) ................................ 2012-227911

(51) Int. Cl.
*B60L 11/18* (2006.01)
*B60L 11/08* (2006.01)
(Continued)

(52) U.S. Cl.
CPC ........... *B60L 11/1816* (2013.01); *B60L 1/006* (2013.01); *B60L 11/08* (2013.01); *B60L 11/12* (2013.01);
(Continued)

(58) Field of Classification Search
CPC .. B60L 11/1809; B60L 11/12; Y02T 10/7072; Y02T 10/6269; Y02T 10/7077;
(Continued)

(56) References Cited

U.S. PATENT DOCUMENTS

| 2009/0243518 | A1* | 10/2009 | Itoh | ........................ B60K 6/365 318/98 |
| 2010/0030412 | A1* | 2/2010 | Mitsutani | ................ B60L 3/003 701/22 |
| 2012/0158245 | A1* | 6/2012 | Yoshizawa | .............. B60R 16/03 701/36 |

FOREIGN PATENT DOCUMENTS

JP    2005-204363    7/2005

* cited by examiner

*Primary Examiner* — Jared Fureman
*Assistant Examiner* — Terrence Willoughby
(74) *Attorney, Agent, or Firm* — Finnegan, Henderson, Farabow, Garrett & Dunner, LLP (57) ABSTRACT

A control unit for a vehicle is configured to control a power-generating unit such that electric power generated by the power-generating unit becomes smaller than that generated when a voltage between terminals of a smoothing capacitor is equal to or larger than an output voltage of a battery, when all of conditions i)-iii) are satisfied, where i) an external power supply unit supplies electric power to the outside in a condition where a shift lever is placed in a parking position, ii) after an amount of electric power stored in the battery is reduced to be smaller than a predetermined power storage amount in a condition where a relay is switched OFF, the relay is operated switch ON, and electric power is generated by the power-generating unit, and iii) the voltage between the terminals of the smoothing capacitor is smaller than the output voltage of the battery.

4 Claims, 4 Drawing Sheets

(51) Int. Cl.
*B60L 1/00* (2006.01)
*B60L 11/12* (2006.01)
*B60W 20/00* (2016.01)

(52) U.S. Cl.
CPC ....... *B60L 11/1809* (2013.01); *B60L 11/1861* (2013.01); *B60L 2210/14* (2013.01); *B60L 2210/40* (2013.01); *B60L 2220/14* (2013.01); *B60L 2240/30* (2013.01); *B60L 2240/427* (2013.01); *B60L 2240/429* (2013.01); *B60L 2240/527* (2013.01); *B60L 2240/547* (2013.01); *B60L 2270/20* (2013.01); *B60W 20/00* (2013.01); *Y02T 10/6269* (2013.01); *Y02T 10/642* (2013.01); *Y02T 10/705* (2013.01); *Y02T 10/7005* (2013.01); *Y02T 10/7022* (2013.01); *Y02T 10/7044* (2013.01); *Y02T 10/7072* (2013.01); *Y02T 10/7077* (2013.01); *Y02T 10/7225* (2013.01); *Y02T 10/7241* (2013.01); *Y02T 90/127* (2013.01); *Y02T 90/14* (2013.01); *Y10S 903/904* (2013.01)

(58) Field of Classification Search
CPC ............. Y02T 10/7044; Y02T 10/7005; Y02T 10/705; Y02T 10/7241; Y02T 10/7022; Y02T 10/7225; Y02T 10/642; Y02T 90/14; Y02T 90/127
See application file for complete search history.

VEHICLE AND METHOD OF CONTROLLING THE VEHICLE

CROSS-REFERENCE TO RELATED APPLICATIONS

This application is a national phase application of International Application No. PCT/IB2013/002342, filed Oct. 11, 2013, and claims the priority of Japanese Application No. 2012-227911, filed Oct. 15, 2012, the content of both of which is incorporated herein by reference.

BACKGROUND OF THE INVENTION

1. Field of the Invention

The invention relates to a vehicle and a method of controlling the vehicle. More specifically, the invention relates to a vehicle capable of being electrically driven, which includes a power-generating unit, a battery configured to be charged and discharged, a power converter configured to convert electric power of the power-generating unit into electric power of the battery, and convert electric power of the battery into electric power of the power-generating unit, and a smoothing capacitor connected to a power line between the power-generating unit and the power converter, and also relates to a method of controlling the vehicle.

2. Description of Related Art

As one example of the above type of vehicle, there has been proposed an electrically driven vehicle including a battery, a motor for running the vehicle, an engine that generates power for running the vehicle, a generator that generates electric power using power of the engine, an inverter unit that consists of an inverter for driving the motor, and an inverter for driving the generator, which inverter is connected in parallel with the inverter for the motor, a converter that regulates the voltage of the battery and the voltage of the inverter unit, and a plug unit mounted at a position closer to the inverter unit than the converter (see, for example, Japanese Patent Application Publication No. 2005-204363 (JP 2005-204363 A)). In the electrically driven vehicle, when a switch that permits the plug unit to be used is turned ON, electric power supplied from the battery is converted by the converter into AC 100V power, and supplied to the plug unit, provided that there is no abnormality in the system in a condition where the vehicle is stopped, and a sufficiently large amount of electric power is stored in the battery.

However, in the electrically driven vehicle as described above, the converter is connected to a circuit including the inverter unit even when the user wishes to use only the plug unit; therefore, the electric power supplied from the battery is wastefully consumed by the inverter unit, etc.

SUMMARY OF THE INVENTION

As a countermeasure against consumption of electric power as described above, it may be proposed to provide a relay for disconnecting the inverter unit from an electric power line through which electric power is supplied from the battery to the plug unit, and switch off the relay when the plug unit is used, so as to disconnect the inverter unit from the power line. If the amount of electric power stored in the battery is reduced, the relay is switched on so that the inverter unit is connected to the power line, and the engine is driven so as to cause the generator to generate electric power to be supplied to the battery. At this time, if the voltage between the terminals of a smoothing capacitor that is generally mounted between the inverter unit and the converter is low, excessively large current generated may flow into devices of the converter, etc. and cause damage to the devices in some occasions.

The present invention provides a vehicle in which, when electric power generated by a power-generating unit is supplied to a battery while electric power is being supplied from the battery to an external power supply unit, excessively large current is prevented from flowing into devices of a power converter, or the like, so that the devices are less likely or unlikely to be damaged or broken.

A vehicle according to a first aspect of the invention is constructed as follows. The vehicle includes a power-generating unit, a battery, a power converter, a smoothing capacitor, an external power supply unit, a relay, and a control unit. The battery is configured to be charged and discharged. The power converter is configured to convert electric power of the power-generating unit into electric power of the battery, and convert electric power of the battery into electric power of the power-generating unit. The smoothing capacitor is connected to a first power line between the power-generating unit and the power converter. The external power supply unit is connected to a second power line between the battery and the power converter, and the external power supply unit is configured to supply electric power to an outside of the vehicle. The relay is connected to a point of the second power line located closer to the power converter than a point thereof to which the external power supply unit is connected. When the relay being switched ON a first portion of the second power line closer, to the power converter is connected to a second portion of the second power line closer to the battery, and when the relay being switched OFF the first portion of the second power line closer to the power converter is disconnected from the second portion of the second power line closer to the battery. The control unit is configured to control the power-generating unit so that electric power generated by the power-generating unit becomes smaller than that generated when a voltage between terminals of the smoothing capacitor is equal to or larger than an output voltage of the battery, when all of conditions i)-iii) are satisfied. The condition i) is that the external power supply unit supplies electric power to the outside in a condition where a shift lever is placed in a parking position. The condition ii) is that, after an amount of electric power stored in the battery is reduced to be smaller than a predetermined power storage amount in a condition where the relay is switched OFF, the relay is operated to switch ON, and electric power is generated by the power-generating unit. The condition iii) is that the voltage between the terminals of the smoothing capacitor is smaller than the output voltage of the battery.

In the vehicle of the invention, when electric power is supplied to the outside of the vehicle via the external power supply unit while the shift lever is placed in a parking position, the power converter is disconnected from the battery by means of the relay. In this condition, if the amount of electric power stored in the battery is reduced down to an amount smaller than a predetermined power storage amount, the relay is operated so as to connect the power converter to the battery, and electric power is generated by the power-generating unit. At this time, if the voltage between the terminals of the smoothing capacitor is smaller than the output voltage of the battery, the power-generating unit is controlled so that the electric power generated by the power-generating unit becomes smaller than that in the case where the voltage between the terminals of the smoothing capacitor is equal to or larger than the output voltage of the battery. With this control, excessively large current can be prevented from flowing into devices used in the power converter when electric power is generated by the power-generating unit, and, consequently, the possibility of damaging or breaking the devices used in the electric power conversion unit can be reduced.

The vehicle of the invention may be constructed as follows. The control unit may be configured to control the power-generating unit so that the electric power generated by the power-generating unit becomes substantially equal to a predetermined electric power, and the predetermined electric power provides a current that does not damage any device used in the power converter.

A method of controlling a vehicle according to a second aspect of the invention is arranged as follows. The vehicle includes a power-generating unit, a battery, a smoothing capacitor, an external power supply unit, a relay, and a control unit, and the smoothing capacitor is connected to a first power line between the power-generating unit and the power converter, while the external power supply unit is connected to a second power line between the battery and the power converter. The relay is connected to a point of the second power line located closer to the power converter than a point thereof to which the external power supply unit is connected. The method includes steps as follows: connecting a first portion of the second power line closer to the power converter to a second portion of the second power line closer to the battery, when the relay is switched ON, disconnecting the first portion of the second power line closer to the power converter from the second portion of the second power line closer to the battery, when the relay is switched OFF, charging and discharging the battery, converting electric power of the power-generating unit into electric power of the battery, and converting electric power of the battery into electric power of the power-generating unit, supplying electric power from the external power supply unit to an outside of the vehicle in a condition where a shift lever is placed in a parking position, and controlling the power-generating unit so that electric power generated by the power-generating unit becomes smaller than that generated when a voltage between terminals of the smoothing capacitor is equal to or larger than an output voltage of the battery, when all of conditions i)-iii) are satisfied. The condition i) is that the external power supply unit supplies electric power to the outside in the condition where the shift lever is placed in the parking position. The condition ii) is that, after an amount of electric power stored in the battery is reduced to be smaller than a predetermined power storage amount in a condition where the relay is switched OFF, the relay is operated to switch ON, and electric power is generated by the power-generating unit. The condition iii) is that the voltage between the terminals of the smoothing capacitor is smaller than the output voltage of the battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described.

Figure 1:
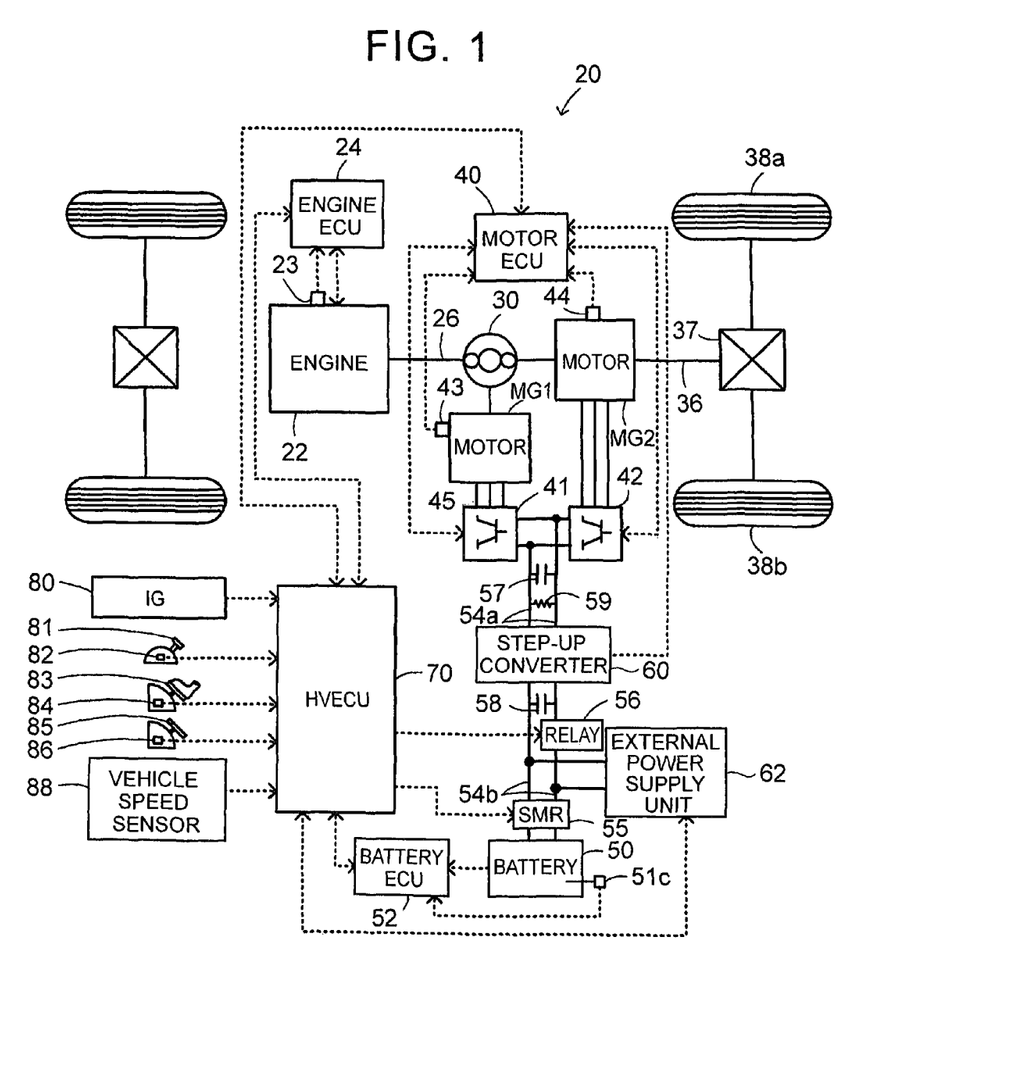
FIG. 1 is a view schematically showing the construction of a hybrid vehicle 20 as one embodiment of the invention.
Figure 2:
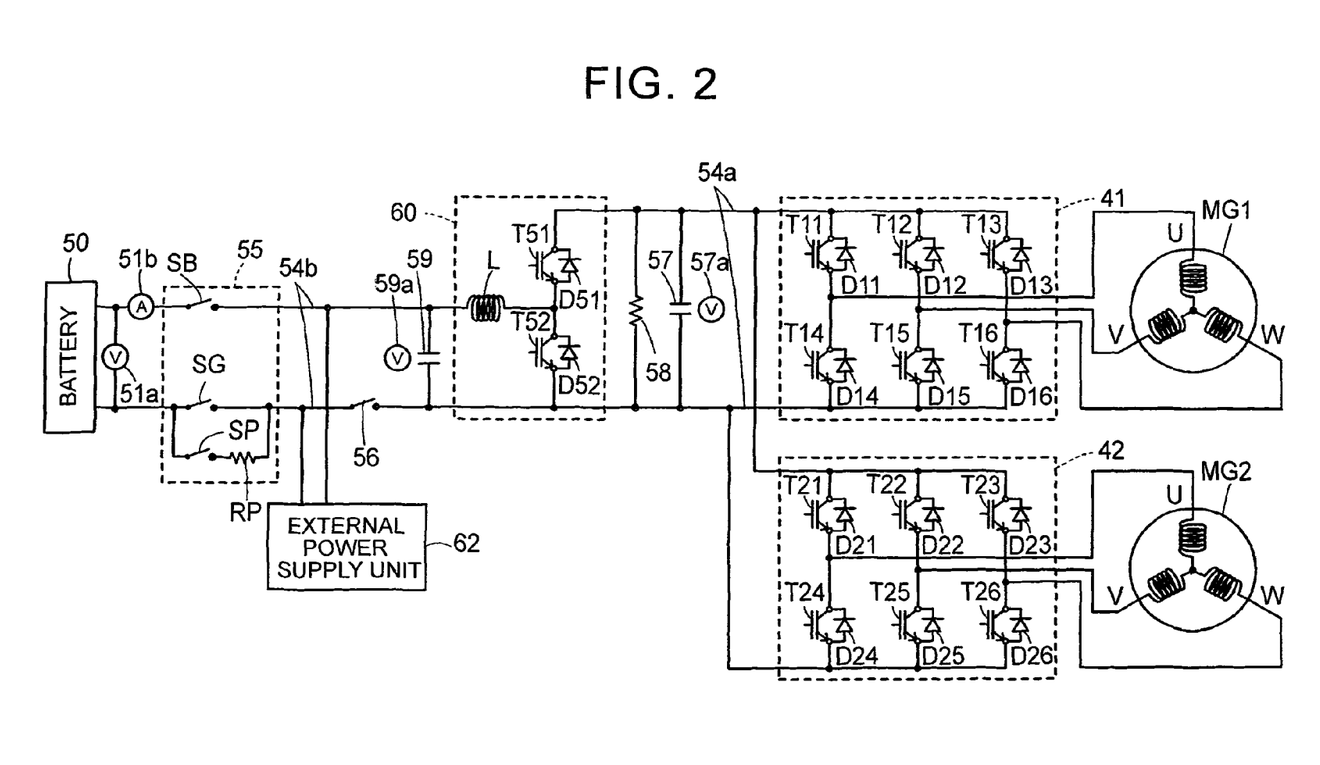
FIG. 2 is a view schematically showing the configuration of an electric system including motors MG1, MG2.

FIG. 1 schematically shows the construction of a hybrid vehicle 20 as one embodiment of the invention. FIG. 2 schematically shows the configuration of an electric system including motors MG1, MG2. As shown in FIG. 1, the hybrid vehicle 20 of this embodiment includes an engine 22 that generates power, using gasoline, light oil, or the like, as a fuel, an electronic control unit for the engine (which will be called "engine ECU") 24 that performs drive control on the engine 22, and a planetary gear set 30 having a carrier connected to a crankshaft 26 of the engine 22, and a ring gear connected to a drive shaft 36 that is coupled to front wheels 38a, 38a via a differential gear 37 for front wheels. The hybrid vehicle 20 also includes a motor MG1 that is configured as a synchronous generator-motor, for example, and has a rotor connected to a sun gear of the planetary gear set 30, a motor MG2 that is configured as a synchronous generator-motor, for example, and has a rotor connected to the drive shaft 36, inverters 41, 42 for driving the motors MG1, MG2, a battery 50 configured as a lithium-ion secondary battery, for example, a step-up converter 60, and an electronic control unit for the motors (which will be called "motor ECU") 40. The step-up converter 60 is connected to an electric power line (which will be called "driving-voltage power line" or "driving power line") 54a to which the inverters 41, 42 are connected, and an electric power line (which will be called "battery-voltage power line" or "battery power line") 54b to which the battery 50 is connected. The step-up converter 60 controls the voltage VH of the driving power line 54a, and permits electric power to be supplied and received between the driving power line 54a and the battery power line 54b. The motor ECU 40 controls the inverters 41, 42 so as to perform drive control on the motors MG1, MG2, and also controls the step-up converter 55. The hybrid vehicle 20 further includes an electronic control unit for the battery (which will be called "battery ECU") 52 that manages the battery 50, an external power supply unit 62 connected to the battery power line 54b, and an electronic control unit for the hybrid vehicle (which will be called "HVECU") 70 that controls the hybrid vehicle 20 as a whole.

The engine ECU 24 is configured as a microprocessor having CPU as a main component, and includes ROM that stores processing programs, RAM that temporarily stores data, input and output ports, and a communication port, in addition to the CPU. The engine ECU 24 receives various signals from various sensors that detect operating conditions of the engine 22, via the input port. For example, the engine ECU 24 receives a crank position θcr from a crank position sensor that detects the rotational position of the crankshaft 26, a coolant temperature Tw from a water temperature sensor that detects the temperature of cooling water of the engine 22, a pressure Pin in each cylinder of the engine 22 from a pressure sensor mounted in a corresponding combustion chamber, and a cam position θca from a cam position sensor that detects the rotational position of each camshaft that opens and closes intake valves or exhaust valves that permit air to be drawn into or discharged from combustion chambers. The engine ECU 24 also receives a throttle position TP from a throttle position sensor that detects the position of a throttle valve, an intake air amount Qa from an air flow meter mounted in an intake pipe, an intake air temperature Ta from a temperature sensor mounted in the intake pipe, an air-fuel ratio AF from an air-fuel ratio sensor mounted in an exhaust system, an oxygen signal O2 from an oxygen sensor mounted in the exhaust system, and so forth. The engine ECU 24 outputs various control signals for driving the engine 22, via the output port. For example, the engine ECU 24 outputs a drive signal to each fuel injection valve, a drive signal to a throttle motor that adjusts the position of the throttle valve, a control signal to an ignition coil integrated with each igniter of the engine 22, a control signal to a variable valve timing mechanism capable of changing the opening and closing timing of intake valves, and so forth. Also, the engine ECU 24, which communicates with the HVECU 70, controls operation of the engine 22 according to a control signal from the HVECU 70, and outputs data concerning operating conditions of the engine 22 to the HVECU 70 as needed. The engine ECU 24 calculates the number of rotations of the crankshaft 26, or the speed of revolution Ne of the engine 22, based on the signal from the crank position sensor (not shown) mounted on the crankshaft 26.

Each of the motors MG1, MG2 is configured as a well-known synchronous generator-motor including a rotor in which a permanent magnet is embedded, and a stator on which coils of three phases are wound. As shown in FIG. 2, the inverter 41 consists of six transistors T11-T16, and six diodes D11-D16 connected in parallel with the transistors T11-T16 in the reverse directions. Similarly, the inverter 42 consists of six transistors T21-T26, and six diodes D21-D26 connected in parallel with the transistors T21-T26 in the reverse directions. The transistors T11-T16, T21-T26 are arranged such that a pair of transistors (T11, T14; T12, T15; T13, T16; T21, T24; T22, T25: T23, T28) are connected in series on the source side and the sink side between a positive bus and a negative bus of the driving power line 54a, and each of the three-phase coils (U-phase, V-phase, W-phase) of the motors MG1, MG2 is connected to a corresponding one of connecting points between the respective pairs of transistors. Accordingly, by regulating the proportion of the ON times of each pair of the transistors T11-T16, T21-T26, in a condition where a voltage is applied to the inverters 41, 42, a rotating magnetic field can be formed in the three-phase coils, and the motors MG1, MG2 can be rotated/driven. Since the inverters 41, 42 share the positive bus and negative bus of the driving power line 54a, electric power generated by one of the motors MG1, MG2 can be supplied to the other motor.

As shown in FIG. 2, the step-up converter 60 consists of two transistors T51, T52, two diodes D51, D52 connected in parallel with the transistors T51, T52 in the reverse directions, and a reactor L. The two transistors T51, T52 are respectively connected to the positive bus of the driving power line 54a, and the negative bus of the driving power line 54a and the battery power line 54b, and the reactor L is connected between a connecting point of the transistors T51, T52 and the positive bus of the battery power line 54b. Accordingly, by switching the transistors T51, T52 between the ON and OFF states, it is possible to boost the voltage of the battery power line 54b and supply the resulting electric power to the driving power line 54a, or step down the voltage of the driving power line 54a and supply the resulting electric power to the battery power line 54b.

A smoothing capacitor 57 for smoothing the voltage and a discharging resistor 58 are connected in parallel to the driving power line 54a. Also, a system main relay 55 that consists of a positive-side relay SB, a negative-side relay SG, a pre-charging relay SP and a pre-charging resistor RP is mounted in a portion of the battery power line 54b close to the output terminals of the battery 50, and a relay 56 for disconnecting a circuit including the step-up converter 60 from the battery power line 54b is mounted between the system main relay 55 and the step-up converter 60. In addition, a filter capacitor 59 for smoothing the voltage is connected to a portion of the battery power-line 54b close to the step-up converter 60.

Although not illustrated in the drawings, the motor ECU 40 is configured as a microprocessor having CPU as a main component, and includes ROM that stores processing programs, RAM that temporarily stores data, input and output ports, and a communication port, in addition to the CPU. The motor ECU 40 receives signals needed to perform drive control on the motors MG1, MG2, via the input port. For example, the motor ECU 40 receives rotational positions θm1, θm2 from rotational position detection sensors 43, 44 that detect the rotational positions of rotors of the motors MG1, MG2, respectively, phase currents applied to the motors MG1, MG2 and detected by current sensors (not shown), a voltage across the smoothing capacitor 57 (a voltage of the driving power line 54a) VH from a voltage sensor 57a mounted between the terminals of the capacitor 57, and a voltage across the filter capacitor 59 (a voltage of the battery power line 54b) VL from a voltage sensor 59a mounted between the terminals of the filter capacitor 59. The motor ECU 40 outputs switching control signals to the transistors T11-T16, T21-T26 of the inverters 41, 42, and switching control signals to the transistors T51, T52 of the step-up converter 55, via the output port. Also, the motor ECU 40, which communicates with the HVECU 70, performs drive control on the motors MG1, MG2 according to a control signal from the HVECU 70, and outputs data concerning operating conditions of the motors MG1, MG2 to the HVECU 70 as needed. The motor ECU 40 calculates the rotating speeds Nm1, Nm2 of the motors MG1, MG2, based on the rotational positions θm1, θm2 of the rotors of the motors MG1, MG2 received from the rotational position detection sensors 43, 44.

Although not illustrated in the drawings, the battery ECU 52 is configured as a microprocessor including CPU as a main component, and includes ROM that stores processing programs, RAM that temporarily stores data, input and output ports, and a communication port, in addition to the CPU. The battery ECU 52 receives signals needed to manage the battery 50. For example, the battery ECU 52 receives a voltage Vb between the terminals of the battery 50, from a voltage sensor 51a installed between the terminals of the battery 50, charging/discharging current Ib from a current sensor 51b mounted in a power line connected to the output terminal of the battery 50, and a battery temperature Tb from a temperature sensor 51c mounted in the battery 50. The battery ECU 52 transmits data concerning conditions of the battery 50 to the HVECU 70 via communication as needed. Also, the battery ECU 52 calculates the power storage percentage (the state of charge) SOC as the percentage of the amount of electric power that can be discharged from the battery 50 at this moment relative to the total capacity, based on the integrated value of charging/discharging current Ib detected by the current sensor 51b, and calculates input and output limits Win, Wout as the maximum permissible power with which the battery 50 can be charged or which can be discharged from the battery 50, based on the calculated power storage percentage SOC and the battery temperature Tb.

Although not illustrated in the drawings, the external power supply unit 62 consists of a DC/AC converter that converts DC power of the battery power line 54b into AC power, a transformer that transforms the AC power received from the DC/AC converter, into AC power having a desired voltage (for example, AC 100V power), and a plug for connection of an electric load. The external power supply unit 60 is adapted to supply electric power to the electric load connected to the plug. The DC/AC converter and transformer of the external power supply unit 62 are controlled by the HVECU 70, based on voltage and current from a voltage sensor and a current sensor (not shown), so that the preset AC power (e.g., AC 100V power) is supplied to the electric load connected to the plug.

Although not illustrated in the drawings, the HVECU 70 is configured as a microprocessor having CPU as a main component, and includes ROM that stores processing programs, RAM that temporarily stores data, input and output ports, and a communication port, in addition to the CPU. The HVECU 70 receives, via the input port, an ignition signal from an ignition switch 80, a shift position SP from a shift position sensor 82 that detects a position to which a shift lever 81 is operated, an accelerator operation amount Acc from an accelerator pedal position sensor 84 that detects the amount of depression of an accelerator pedal 83, a brake pedal position BP from a brake pedal position sensor 86 that detects the amount of depression of a brake pedal 85, and a vehicle speed V from a vehicle speed sensor 88. Also, the HVECU 70 controls the DC/AC converter and transformer of the external power supply unit 62. As described above, the HVECU 70 is connected with the engine ECU 24, motor ECU 40, and the battery ECU 52, via the communication ports, and transmits and receives various control signals and data to and from the engine ECU 24, motor ECU 40, and the battery ECU 52.

In the hybrid vehicle 20 of the embodiment constructed as described above, required torque Tr* to be generated to the drive shafts 36F, 36R is calculated based on the accelerator operation amount Acc corresponding to the amount of depression of the accelerator pedal by the driver, and the vehicle speed V, and the operation of the engine 22 and the motors MG1, MG2 is controlled so that required power corresponding to the required torque Tr* is delivered to the drive shaft 36. The engine 22 and the motors MG1, MG2 are controlled to operate in a selected one of operating modes including a torque conversion operating mode, a charge/discharge operating mode, and a motor operating mode. In the torque conversion operating mode, the operation of the engine 22 is controlled so that power commensurate with the required power is generated from the engine 22, and the motor MG1 and the motor MG2 are controlled so that the entire power generated from the engine 22 is converted into torque by means of the planetary gear set 30, motor MG1 and the motor MG2, and is delivered to the drive shaft 36. In the charge/discharge operating mode, the operation of the engine 22 is controlled so that power commensurate with the sum of the required power and electric power needed to charge the battery 50 is generated from the engine 22, and the motors MG1, MG2 are controlled so that the whole or a part of the power generated from the engine 22 while the battery 50 is being charged or discharged is converted into torque by means of the planetary gear set 30, motor MG1 and the motor MG2, and the required power is delivered to the drive shaft 36. In the motor operating mode, the operation of the engine 22 is stopped, and the motor MG2 is controlled so that power commensurate with the required power is delivered from the motor MG2 to the drive shaft 36. In both of the torque conversion operating mode and the charge/discharge operating mode, the engine 22 and the motors MG1, MG2 are controlled so that the required power is delivered to the drive shaft 36 while the engine 22 is being operated. Thus, these operating modes may be collectively considered as an engine operating mode.

Figure 3:
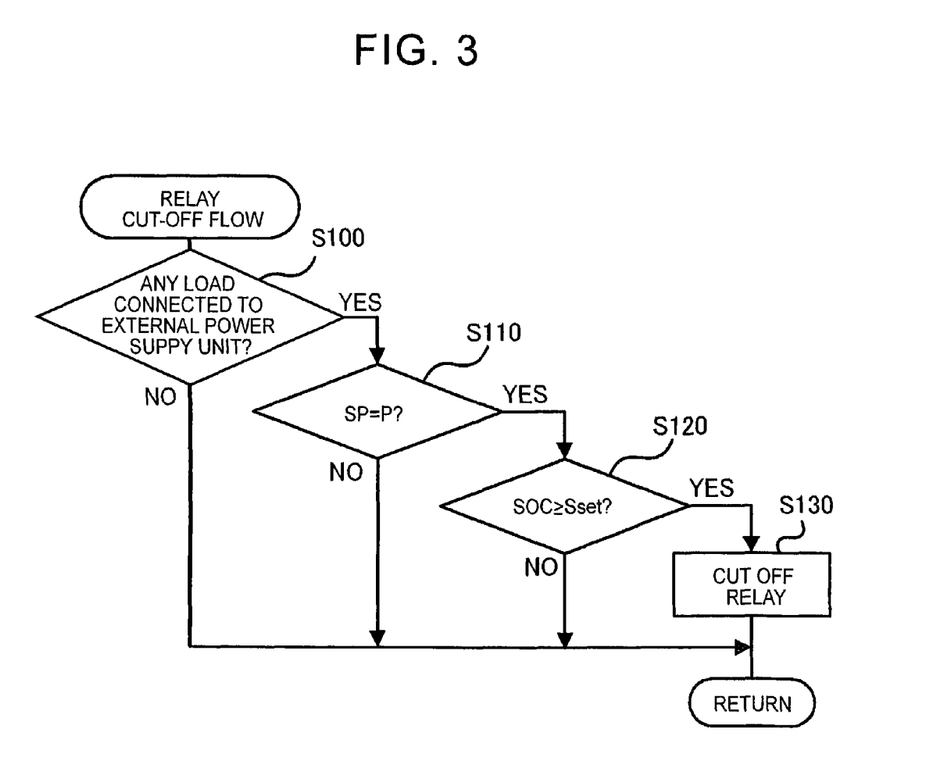
FIG. 3 is a flowchart illustrating one example of relay cut-off flow.

Next, the operation of the hybrid vehicle 20 of the embodiment constructed as described above, in particular, the operation of the hybrid vehicle 20 when electric power is supplied from the external power supply unit 62 to an external electric load, will be described. The electric power is supplied from the external power supply unit 62 to the external electric load basically when the currently selected shift position SP is the parking position (P position) while the vehicle is stopped, and a switch for external power supply (not shown) is turned ON. At this time, the HVECU 70 executes a relay cut-off flow as illustrated in FIG. 3 to determine whether the step-up converter 60 is to be disconnected from the battery power line 54b by the relay 56.

Once the relay cut-off flow is executed, the HVECU 70 determines whether an electric load is connected to the plug of the external power supply unit 62 (S100), whether the currently selected shift position SP is the parking position (P position) (S110), and whether the power storage percentage SOC is equal to or larger than a threshold value Sset (S120). The threshold value Sset is determined in advance as the minimum power storage percentage SOC that permits discharge of electric power from the battery 50, based on the capacity of the battery 50, for example. For example, 30%, 40%, or 50% may be used as the threshold value Sset. If the electric load is connected to the plug of the external power supply unit 62, and the shift position SP is the parking position (P position), while the power storage percentage SOC is equal to or larger than the threshold value Sset, the relay 56 is switched off (cut off) (S130), and the flow of FIG. 3 ends. By switching off the relay 56, it is possible to disconnect the circuit including the step-up converter 60 from the battery power line 54b, and prevent electric power from the battery 50 from being wastefully consumed by the step-up converter 60. On the other hand, if no electric load is connected to the plug of the external power supply unit 62, the HVECU 70 determines that electric power need not be supplied from the external power supply unit 62 to any electric load, and finishes the flow of FIG. 3 without switching off the relay 56. If the electric load is connected to the plug of the external power supply unit 62, but the currently selected shift position SP is not the parking position (P position), and/or the power storage percentage SOC is smaller than the threshold value Sset, the HVECU 70 finishes the flow of FIG. 3 without switching off the relay 56, since at least one of the conditions is not satisfied. In these cases, the circuit including the step-up converter 60 is not disconnected by the relay 56 from the battery power line 54b; therefore, electric power from the battery 50 is also consumed by the circuit including the step-up converter 60.

Figure 4:
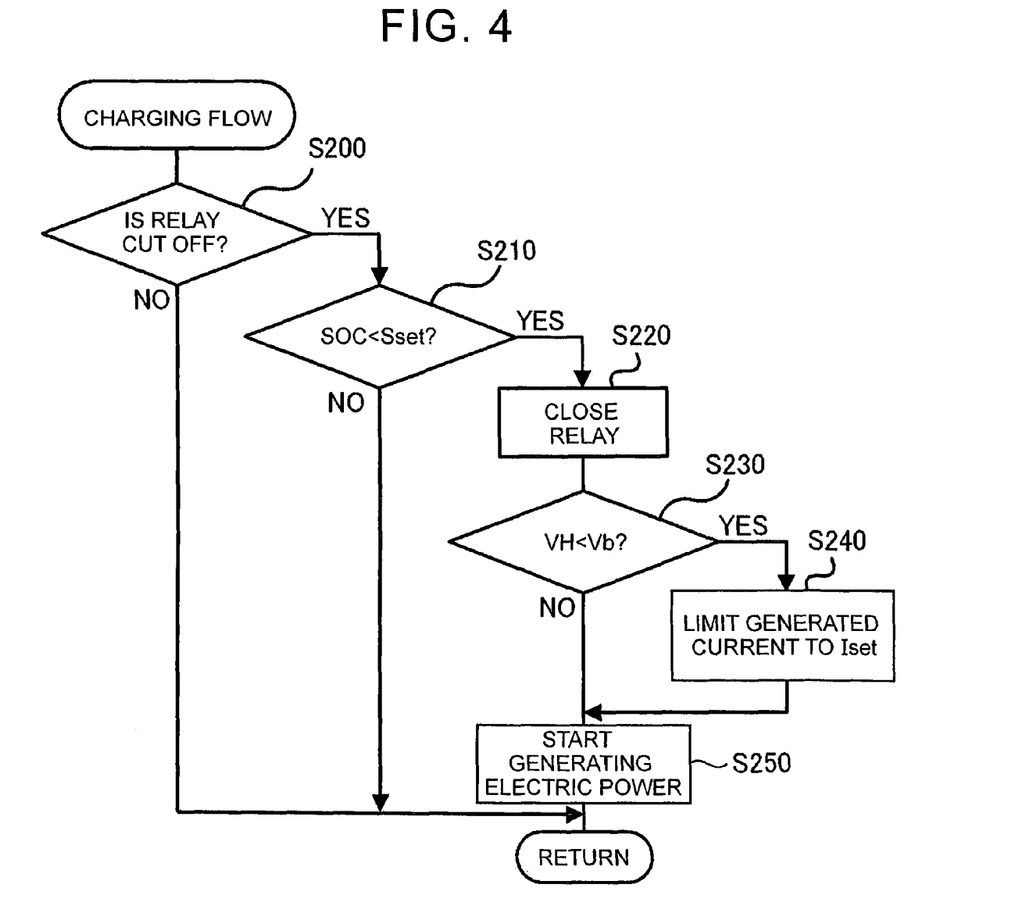
FIG. 4 is a flowchart illustrating one example of charging flow.

Next, a process of charging the battery 50 by starting the engine 22 and causing the motor MG1 to generate electric power, since the power storage percentage SOC of the battery 50 is reduced due to external power supply, will be described. FIG. 4 is a flowchart illustrating one example of charging flow executed by the HVECU 70. Once the charging flow is executed, the HVECU 70 determines whether the relay 56 is cut off (S200), and determines whether the power storage percentage SOC of the battery 50 is smaller than the threshold value Sset (S210). If the relay 56 is not cut off, or the power storage percentage SOC is equal to or larger than the threshold value Sset, the HVECU 70 finishes the flow without charging the battery 50 with electric power generated by the motor MG1. If the relay 56 is cut off, and the power storage percentage SOC is smaller than the threshold value Sset, the relay 56 is switched ON (closed) (S220), and the voltage VH of the driving power line 54a is compared with the battery voltage Vb (step S230). If the voltage VH of the driving power line 54a is equal to or larger than the battery voltage Vb, the HVECU 70 determines that the smoothing capacitor 57 is relatively sufficiently charged, operates the engine 22 so that the motor MG1 starts generating electric power (S250), and finishes the routine of FIG. 4. Namely, the engine 22 is started, and switching of the transistors T11-T16 of the inverter 41 is controlled for regeneration control of the motor MG1. On the other hand, if the voltage VH of the driving power line 54a is smaller than the battery voltage Vb, the HVECU 70 determines that the smoothing capacitor 57 is not sufficiently charged, and sets current generated by the motor MG1 so that the current is controlled to be equal to or smaller than a predetermined value Iset (S240). Then, the engine 22 is started, and the motor MG1 starts generating electric power, so that the generated current becomes equal to or smaller than the value Iset (S250). Then, the HVECU 70 finishes the routine of FIG. 4. The above-indicated value Iset is determined in advance by experiment, or the like, as a value of current that would not cause damage of the transistors T51, T52, etc. of the step-up converter 60. For example, 5 A, 7 A or 10 A may be used as the value Iset. The electric power generated by the motor MG1 is calculated by multiplying the voltage VH of the driving power line 54a by the generated current. The electric power generated by the motor MG1 when the voltage VH of the driving power line 54a is smaller than the battery voltage Vb and the generated current is equal to or smaller than the value Iset assumes a small value since the voltage VH is small. Accordingly, the electric power generated when the voltage VH of the driving power line 54a is smaller than the battery voltage Vb is smaller than the electric power generated when the voltage VH of the driving power line 54a is equal to or larger than the battery voltage Vb.

According to the hybrid vehicle 20 of the embodiment as described above, when the currently selected shift position SP is the parking position (P position), and an electric load is connected to the external power supply unit 62, the relay 56 is switched off so that the battery 50 is disconnected from the step-up converter 60. In this condition, if the power storage percentage SOC of the battery 50 is reduced down to a value smaller than the threshold value Sset, the relay 56 is switched on (i.e., closed) so that the step-up converter 60 is connected to the battery 4, and the motor MG1 generates electric power using the power from the engine 22. If the voltage VH of the driving power line 54a, or the voltage between the terminals of the smoothing capacitor 57, is smaller than the battery voltage Vb when the electric power is generated by the motor MG1, the motor MG1 is subjected to regeneration control so that the generated current becomes equal to or smaller than the value Iset. Namely, the motor MG1 is subjected to regeneration control so that the generated power becomes smaller than that in the case where the voltage VH of the smoothing capacitor 57 is equal to or larger than the battery voltage Vb. With this control, excessively large current is less likely or unlikely to flow into the transistors T51, T52, etc. of the step-up converter 60, and, consequently, devices, such as the transistors T51, T52 of the step-up converter 60, are less likely or unlikely to be damaged.

In the above-described embodiment, the engine 22, motor MG1 and the inverter 41 can be regarded as "power-generating unit", and the battery 50 can be regarded as "battery", while the step-up converter 60 can be regarded as "power converter". The smoothing capacitor 57 can be regarded as "smoothing capacitor", and the external power supply unit 62 can be regarded as "external power supply unit", while the relay 56 can be regarded as "relay", and the HVECU 70 that executes the charging flow illustrated in FIG. 4 can be regarded as "control unit".

While one embodiment of the invention has been described above, this invention is by no means limited to the above-described embodiment, but may be embodied in various forms, without departing from the principle of the invention.

This invention can be utilized in a vehicle manufacturing industry, for example.

The invention claimed is:
1. A vehicle comprising:
a power-generating unit;
a battery configured to be charged and discharged;
a power converter configured to convert electric power of the power-generating unit into electric power of the battery, and convert electric power of the battery into electric power of the power-generating unit;
a smoothing capacitor connected to a first power line between the power-generating unit and the power converter;
an external power supply unit connected to a second power line between the battery and the power converter, the external power supply unit being configured to supply electric power to an outside of the vehicle;
a relay connected to a point of the second power line located closer to the power converter than a point thereof to which the external power supply unit is connected, when the relay being switched ON a first portion of the second power line closer to the power converter is connected to a second portion of the second power line closer to the battery, and when the relay being switched OFF the first portion of the second power line closer to the power converter is disconnected from the second portion of the second power line closer to the battery; and
a control unit configured to control the power-generating unit such that electric power generated by the power-generating unit becomes smaller than that generated when a voltage between terminals of the smoothing capacitor is equal to or larger than an output voltage of the battery, when all of conditions i)-iii) are satisfied, where
i) the external power supply unit supplies electric power to the outside in a condition where a shift lever is placed in a parking position,
ii) after an amount of electric power stored in the battery is reduced to be smaller than a predetermined power storage amount in a condition where the relay is switched OFF, the relay is operated to switch ON and electric power is generated by the power-generating unit; and
iii) the voltage between the terminals of the smoothing capacitor is smaller than the output voltage of the battery.
2. The vehicle according to claim 1, wherein:
the control unit is configured to control the power-generating unit such that the electric power generated by the power-generating unit becomes substantially equal to a predetermined electric power; and
the predetermined electric power provides a current that does not damage any device used in the power converter.

3. A method of controlling a vehicle including a power-generating unit, a battery, a power converter, a smoothing capacitor, an external power supply unit, a relay, and a control unit, the smoothing capacitor being connected to a first power line between the power-generating unit and the power converter, the external power supply unit being connected to a second power line between the battery and the power converter, the relay being connected to a point of the second power line located closer to the power converter than a point thereof to which the external power supply unit is connected, the method comprising:

connecting a first portion of the second power line closer to the power converter to a second portion of the second power line closer to the battery, when the relay is switched ON;

disconnecting the first portion of the second power line closer to the power converter from the second portion of the second power line closer to the battery, when the relay is switched OFF;

charging and discharging the battery;

converting electric power of the power-generating unit into electric power of the battery, and converting electric power of the battery into electric power of the power-generating unit;

supplying electric power from the external power supply unit to an outside of the vehicle in a condition where a shift lever is placed in a parking position; and controlling, by the control unit, the power-generating unit such that electric power generated by the power-generating unit becomes smaller than that generated when a voltage between terminals of the smoothing capacitor is equal to or larger than an output voltage of the battery, when all of conditions i)-iii) are satisfied, where i) the external power supply unit supplies electric power to the outside in the condition where the shift lever is placed in the parking position, ii) after an amount of electric power stored in the battery is reduced to be smaller than a predetermined power storage amount in a condition where the relay is switched OFF, the relay is operated to switch ON and electric power is generated by the power-generating unit; and iii) the voltage between the terminals of the smoothing capacitor is smaller than the output voltage of the battery.

4. The method according to claim 3, wherein:

the power-generating unit is controlled, by the control unit, such that the electric power generated by the power-generating unit becomes substantially equal to a predetermined electric power; and the predetermined electric power provides a current that does not damage any device used in the power converter.

* * * * *